(12) United States Patent
Agirman et al.

(10) Patent No.: US 11,014,786 B2
(45) Date of Patent: May 25, 2021

(54) POWER CONTROL SYSTEM FOR A BATTERY DRIVEN ELEVATOR

(71) Applicant: Otis Elevator Company, Farmington, CT (US)

(72) Inventors: Ismail Agirman, Southington, CT (US); Marvin Dehmlow, Berlin (DE); Bernd Fischer, Berlin (DE); Carlo Mezzadri, Milan (IT)

(73) Assignee: OTIS ELEVATOR COMPANY, Farmington, CT (US)

( * ) Notice: Subject to any disclaimer, the term of this patent is extended or adjusted under 35 U.S.C. 154(b) by 517 days.

(21) Appl. No.: 15/900,979

(22) Filed: Feb. 21, 2018

(65) Prior Publication Data

US 2018/0237268 A1 Aug. 23, 2018

(30) Foreign Application Priority Data

Feb. 22, 2017 (EP) .................................... 17157406

(51) Int. Cl.
*B66B 1/30* (2006.01)
*B66B 11/04* (2006.01)
(Continued)

(52) U.S. Cl.
CPC ............ *B66B 11/043* (2013.01); *B66B 1/302* (2013.01); *H02J 7/00* (2013.01); *H02J 7/0068* (2013.01);
(Continued)

(58) Field of Classification Search
CPC .. B66B 1/30; B66B 1/302; B66B 1/28; B66B 5/0031; B66B 1/306; B66B 1/343;
(Continued)

(56) References Cited

U.S. PATENT DOCUMENTS 4,506,766 A * 3/1985 Watanabe ............... B66B 5/027
187/290
6,742,630 B2 6/2004 Eilinger
(Continued)

FOREIGN PATENT DOCUMENTS

CN 100588075 C 2/2010
EP 1765709 B1 1/2013
(Continued)

OTHER PUBLICATIONS

European Search Report for application EP 17157406, dated Aug. 30, 2017, 8 pages.
(Continued)

*Primary Examiner* — Marlon T Fletcher
(74) *Attorney, Agent, or Firm* — Cantor Colburn LLP

(57) ABSTRACT

The subject-matter disclosed relates to a power control system (10) for a battery driven elevator; the power control system (10) comprising a DC battery (16) for providing electrical power to an electric motor (24) of the elevator system; and a power controller (22) including a power converter (26), an power inverter (28), and a DC intermediate circuit (30) connected in between the power converter (26) and the power inverter (28); wherein an output of the DC battery (16) is connected to the DC intermediate circuit (30).

11 Claims, 1 Drawing Sheet

(51) Int. Cl.
  *H02P 27/06* (2006.01)
  *H02P 3/22* (2006.01)
  *H02J 7/00* (2006.01)

(52) U.S. Cl.
  CPC .............. *H02P 3/22* (2013.01); *H02P 27/06* (2013.01); *H02J 2207/20* (2020.01)

(58) Field of Classification Search
  CPC . B66B 5/028; B66B 13/143; B66B 2201/216; B66B 5/0093; B66B 5/145; B66B 7/064; H02P 23/26; H02P 1/166; H02P 9/305
  See application file for complete search history.

(56) References Cited

U.S. PATENT DOCUMENTS

| | | | |
|---|---|---|---|
| 7,331,426 B2 | 2/2008 | Jahkonen | |
| 8,053,931 B2 | 11/2011 | Jahkonen | |
| 8,146,714 B2 | 4/2012 | Blasko | |
| 8,172,042 B2 | 5/2012 | Wesson | |
| 8,193,761 B1 | 6/2012 | Singh | |
| 8,575,869 B2 | 11/2013 | Kallioniemi et al. | |
| 9,270,192 B2 | 2/2016 | Barauna | |
| 9,422,141 B2 | 8/2016 | Foley | |
| 2001/0017236 A1* | 8/2001 | Tominaga | B66B 1/30 187/290 |
| 2001/0017237 A1* | 8/2001 | Tominaga | B66B 1/30 187/290 |
| 2001/0017241 A1* | 8/2001 | Tajima | B66B 1/30 187/296 |
| 2001/0017242 A1* | 8/2001 | Tajima | B66B 1/285 187/296 |
| 2002/0053490 A1* | 5/2002 | Banno | B66B 1/30 187/290 |
| 2004/0035646 A1* | 2/2004 | Araki | B66B 5/027 187/290 |
| 2010/0044160 A1* | 2/2010 | Agirman | B66B 5/027 187/290 |
| 2011/0139547 A1* | 6/2011 | Veronesi | B66B 1/302 187/247 |
| 2014/0008155 A1* | 1/2014 | Rossignol | B66B 1/302 187/290 |
| 2015/0122589 A1 | 5/2015 | Mezzadri et al. | |
| 2015/0203328 A1* | 7/2015 | Horbrugger | B66B 1/302 187/290 |
| 2015/0375959 A1* | 12/2015 | Agirman | B66B 1/302 187/247 |
| 2016/0039633 A1* | 2/2016 | Tutat | H05K 1/0265 187/289 |
| 2016/0083220 A1* | 3/2016 | Agirman | H02J 7/02 187/290 |
| 2016/0194179 A1 | 7/2016 | Agirman | |

FOREIGN PATENT DOCUMENTS

| | | |
|---|---|---|
| EP | 1931586 B1 | 6/2013 |
| WO | 2007145628 A1 | 12/2007 |
| WO | 2010059139 A1 | 5/2010 |

OTHER PUBLICATIONS

Gao, Peng et al., "Elevator Regenerative Energy Feedback Technology", Advances in Computer Science Research, vol. 63, International Conference on Artificial Intelligence and Engineering Applications AIEA 2016, pp. 168-175.
European Office Action for application EP17157406, dated Apr. 22, 2020, 5 pages.

* cited by examiner

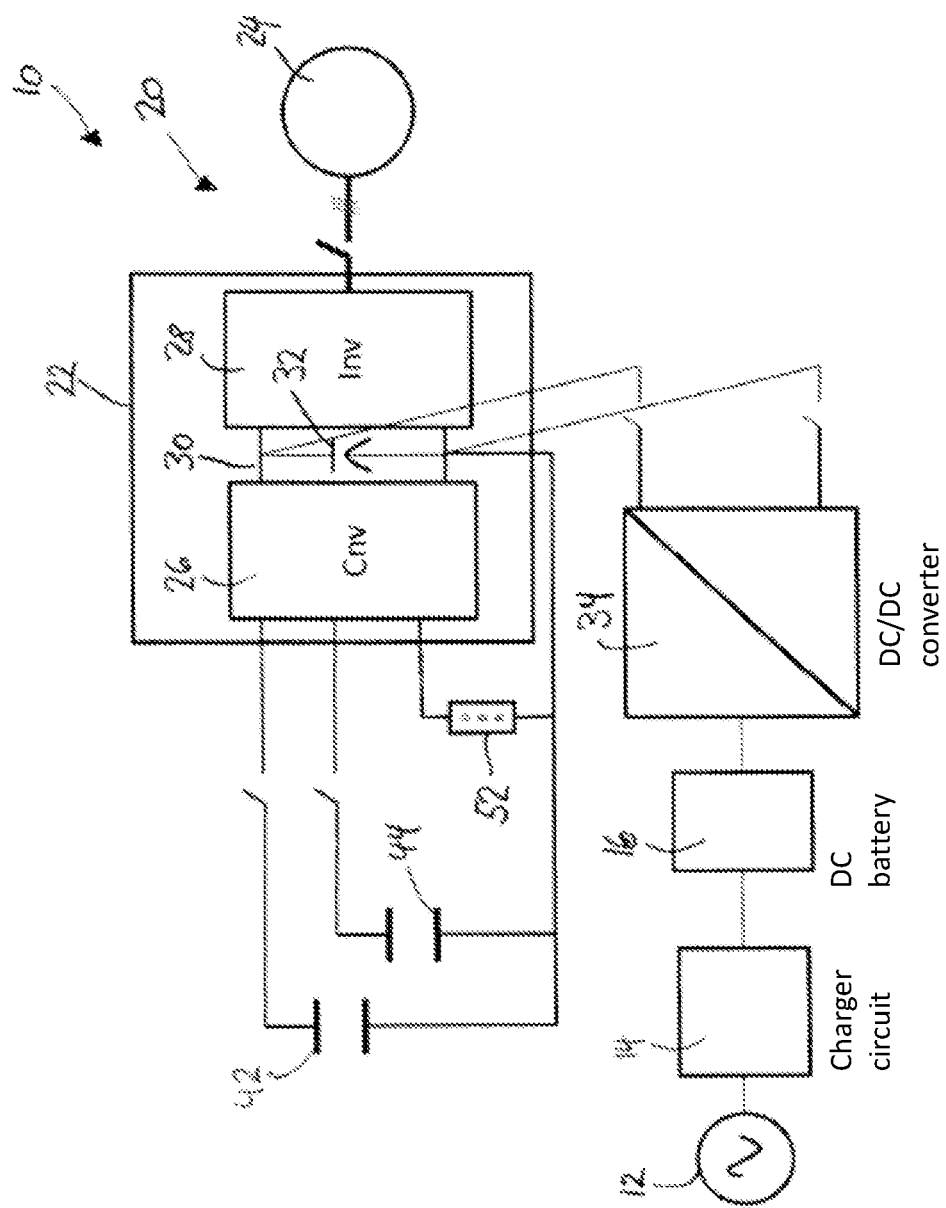

POWER CONTROL SYSTEM FOR A BATTERY DRIVEN ELEVATOR

The subject matter disclosed herein relates generally to the field of elevator systems, in particular to battery powered elevator systems, and more particularly relates to power control systems for battery powered elevator systems.

Battery powered elevator systems employ a DC battery as a power source to an electric motor of an elevator drive machine that imparts motion to an elevator car. A drive unit containing an inverter and the electric motor is typically connected to the DC battery. In motoring mode, the inverter converts DC power from the battery to AC drive signals for the electric motor. In regenerative mode, the inverter converts AC power from the electric motor to DC power for charging the DC battery.

In a battery powered elevator, the DC battery may experience overloading when in motoring mode or overcharging when in regenerative mode. Overloading negatively affects state of charge or usability of the DC battery as a voltage/power source. Overcharging negatively affects the health of the DC battery. Overloading is normally controlled by modifying the motion profile of the elevator car such as to restrict required power. Overcharging is normally controlled using a dynamic braking resistor. Existing power control systems employ a braking resistor and braking relay to connect the braking resistor across the inverter to the electric motor to provide braking to the drive machine.

It would be beneficial to provide a power control system for a battery powered elevator allowing more flexibility with respect to operating the elevator in a motoring mode and in a regenerative mode. Particularly, it would be beneficial to provide such additional flexibility without adding cost and complexity to the elevator.

According to exemplary embodiments, a power control system for a battery driven elevator is provided; the power control system comprising a DC battery for providing electrical power to an electric motor of the elevator system; and a power controller including a power converter, a power inverter, and a DC intermediate circuit connected in between the power converter and the power inverter; wherein an output of the battery is connected to the DC intermediate circuit.

According to further exemplary embodiments, a battery driven elevator is provided comprising an electric motor for driving an elevator car between landings; and the power control system described herein.

According to further exemplary embodiments, a method of assembling a power control system for a battery driven elevator is provided, comprising: providing a DC battery, providing a power controller comprising a power converter, a power inverter, and a DC intermediate circuit connected in between the power converter and the power inverter; and connecting the DC battery to the DC intermediate circuit of the power controller.

Further exemplary embodiments relate to use of a power controller comprising a power converter, a power inverter, and a DC intermediate circuit connected in between the power converter and the power inverter for controlling drive power in a battery driven elevator, wherein a DC battery is connected to the DC intermediate circuit of the power controller. Particularly, at least one power storage device, in particular a supercapacitor, is connected to an input side of the power converter.

Embodiments described herein allow to extend the capability of a power control system for a battery driven elevator to cover higher usage duties than possible with battery driven elevators using conventional power control systems. In a battery driven elevator, a DC battery provides the primary source of electric energy for driving the elevator car. The power control systems disclosed herein particularly allow to recover and recirculate electric power consumed and regenerated by the elevator within the power control system efficiently. Thereby, charging and discharging of the DC battery is reduced to the extent possible and thus DC battery life is improved. Moreover, a commercial "off the shelf" power controller, as is usually used in power control systems supplied by AC power (e.g. from an AC power grid), may be employed in the power control system for a battery driven elevator according to the present disclosure.

Other aspects, features, and techniques of embodiments of the subject matter disclosed herein will become more apparent from the following description taken in conjunction with the drawing.

FIG. 1 is a block diagram of components of a power control system for a battery driven elevator in an exemplary embodiment.

The exemplary embodiment is described with reference to a battery driven elevator, but it is to be understood that the same power control system may be applied to other battery driven motor control systems as well. As shown in FIG. 1, a power control system 10 includes a source of main power 12, such as an electrical main line. In the embodiment shown the source of main power 12 delivers AC power (e.g. 230 volt, single phase). The main power is provided, usually via a switch panel (not shown in FIG. 1) including circuit breakers, meters, etc., to a charger circuit 14 which converts the main power to DC power to charge a DC battery 16. DC battery 16 may be a lead-acid battery, a Li-ion battery, or other type of battery. DC battery 16 may include a group of DC batteries connected serially and/or in parallel. DC battery 16 powers a drive unit 20 of the battery driven elevator. The drive unit 20 includes a power controller 22 and an electric motor 24. The electric motor 24 drives an elevator car (not shown) between landings along a hoistway, e.g. via a traction drive including a traction sheave coupled to an output shaft of the electric motor 24 and tension members (e.g. ropes or belts) coupled to the traction sheave.

The power controller 22 includes a power converter 26, a power inverter 28, and a DC intermediate circuit 30 connected in between an output of the power converter 26 and an input of the power inverter 28. The DC intermediate circuit 30 includes one or more DC intermediate circuit capacitors 32 connected in between positive and negative poles of the DC intermediate circuit 30. The output of the power converter 26 is connected to the DC intermediate circuit 30 and normally provides a rectified output signal of the power converter 26 to the DC intermediate circuit 30. Input of power inverter 28 is connected to the DC intermediate circuit 30 and is supplied with DC power from the DC intermediate circuit 30. The DC intermediate circuit capacitor 32 is designed to smooth the rectified DC power delivered by the output of power converter 26 as required by power switches of the power inverter 28. The power inverter 28 uses power switches to generate drive signals for the motor 24. The power switches may be MOSFET transistors, but it is to be understood that other types of power switches may be used. Each power switch normally includes a flyback diode across its drain-source terminals. Power switches are arranged in phase legs, each phase leg connected between the positive and negative poles of the DC intermediate circuit 30. An AC terminal is provided at a junction (e.g., source-drain junction) of the power switches in each phase leg. The AC terminal provides the output of the respective phase leg of power inverter 28. The AC terminals are coupled to motor windings of the electric motor 24. In an exemplary embodiment, the electric motor 24 is a three-phase, permanent magnet synchronous motor 24. The power inverter 28 may be a three-phase inverter and electric motor 24 may be a three-phase motor, but embodiments are not limited to a particular number of phases.

The power converter 26 may have a configuration corresponding to the configuration of the power inverter 28. Particularly, the power converter 26 may also comprise power switches arranged in phase legs, each phase leg connected between the positive and negative poles of the DC intermediate circuit 30. Different to the power inverter 28, positive and negative poles of the DC intermediate circuit 30 are connected to the output of the phase legs of the power converter 26. A terminal provided at a junction (e.g., source-drain junction) of the power switches in each phase leg provides the input of the respective phase leg of power converter 26. Power converter 26 may use power switches to convert DC power or AC power supplied to its input to a DC voltage supplied at its output. Power switches may be MOSFET transistors, but it is to be understood that other types of power switches may be used. Each power switch normally includes a flyback diode across its drain-source terminals. Power converter 26 will use actively controllable power switches, such as MOSFETs or other semiconductor switches. Thus, the power converter 26 is an actively controlled power converter 26 which is capable of regenerating power from the DC intermediate circuit 30 to the input side of the power converter 26, if desired.

The power controller 22 may be a commercial "off the shelf" power controller. Normally, power controllers of the type used in power control systems as shown in FIG. 1 have an input connected to a main source of power, and an output connected to the electric motor 24 of the drive, in order to supply drive power to the electric motor 24. The power converter 26 of such power controllers 22 is located at an upstream position and has its input connected to the main source of power. The power converter 26 has an output connected to the DC intermediate circuit 30, thus delivering rectified power or DC power to the DC intermediate circuit 30. The power inverter 28 is located on a downstream side of the power controller 22 and has its input connected to the DC intermediate circuit 30, while an output of the power inverter 28 is connected to the electric motor 24, particularly to the motor windings, thus delivering AC power to the electric motor 24, particularly a plurality of AC power signals dependent on the number of motor windings.

In the embodiments disclosed herein, the power controller 22 is connected in a different way, as set out in more detail below.

An output of DC battery 16 is connected via a DC/DC converter 34 to the positive and negative poles of the DC intermediate circuit 30. The DC/DC converter 34 is optional and may provide for conversion of different voltage levels between DC battery 16 and DC intermediate circuit 30. E.g., the DC battery 16 may provide 48 V DC power, while the intermediate circuit 30 may be designed for higher voltage levels. In this way, the DC battery 16 supplies DC power to the power inverter 28, which inverts the DC power from DC battery 16 to AC drive signals, which drive the electric motor 24 to impart motion to the elevator car (not shown in the Figures), e.g. by driving a traction sheave (not shown). The AC drive signals may be multiphase (e.g., three-phase) drive signals for a three-phase electric motor 24.

It is noted that the DC battery 16 is the sole device directly connected to the source of main power 12 (like a single phase AC power grid), and thus the DC battery 16 is the primary power source for the power inverter 28. Hence, the source of power 12 is not directly coupled to the drive unit 20, but only indirectly via the battery 16. Power inverter 28 includes on its input a first DC link coupled to battery 16 (e.g., a positive DC voltage) and a second DC link coupled to battery 16 (e.g., a negative DC voltage or ground) via the DC intermediate circuit 30 of power controller 22.

A control unit (not shown) may be coupled to the power controller 22, particularly to the power inverter 28, to control the power inverter 28 over various modes. In motoring mode, the control unit will control power switches in the power inverter 28 to apply AC drive signals to the electric motor 24 to impart motion to the elevator car. In regenerative mode, the control unit will control power switches in the power inverter 28 to convert AC power from the electric motor 24 to DC power for charging the DC battery 16. Regenerative mode may occur when an empty elevator car is traveling upwards or when a loaded elevator car is traveling downwards. In a braking mode, the control unit will control power switches in the power inverter 28 to control the speed of the elevator car. Braking mode may ensue upon opening of a safety chain in the elevator, or other event. A speed sensor (e.g., a rotary encoder) mounted at the electric motor 24 or any other rotatable part of the drive machine may provide a speed signal to the control unit indicative of the rotational speed of the electric motor 24 or drive machine. Such control unit may be implemented using a general-purpose microprocessor executing a computer program stored on a storage medium to perform the operations described herein. Alternatively, such control unit may be implemented in hardware (e.g., ASIC, FPGA) or in a combination of hardware/software. The control unit may also be part of an elevator control system.

During motoring mode, the control unit will provide control signals to turn power switches of the power inverter 28 alternatingly ON and OFF to generate an AC drive signal at each AC terminal of the power inverter 28. The AC drive signal may be a variable frequency signal. During regenerative mode, the control unit will provide control signals to turn power switches ON and OFF to convert AC power from the electric motor 24 to DC power for the DC intermediate circuit 30 and ultimately for charging the DC battery 16. Current sensors may be provided at each AC terminal of the power inverter 28 to allow the control unit to detect current at each AC terminal, in both motoring mode and regenerative mode. A voltage sensor may be provided at the DC battery 16 to detect battery voltage and provide a sensed voltage to the control unit.

The control unit may control the speed of the elevator car in response to operating parameters of the elevator including battery voltage, motor direct current, car load, etc. For example the DC battery 16 needs to be protected from overloading (i.e., overdrawing current) when the elevator is operating in motoring mode. If the drive machine overloads the DC battery 16, the battery voltage will drop. The control unit may monitor the battery voltage, e.g. from a voltage sensor at the DC battery 16, and adjust the car speed in response to the sensed battery voltage. In motoring mode, the control unit may compare the sensed battery voltage to a lower threshold and if the sensed battery voltage is less than the lower threshold (optionally, for a period of time), the control unit may reduce the car speed by some predetermined amount (e.g., a set m/sec or a percentage of current speed). Also, the DC battery 16 needs to be protected from overcharging when the elevator is operating in regenerative mode. If the drive machine overcharges the DC battery 16, the battery voltage will increase. Thus, the control unit may reduce the car speed in case the sensed battery voltage increases above an upper threshold. The power control system 10 also includes a dynamic braking resistor. In regenerative mode, if the current produced at the electric motor 24 is excessive, the control unit may cause current flow through dynamic braking resistor in order to dissipate excess energy.

In order to reduce loading and discharging of the DC battery as far as possible, the power control system 10 comprises at least one additional power storage device 42, 44. The additional power storage device 42, 44 may include a supercapacitor. The supercapacitor may include a plurality of individual supercapacitors which may be connected in series and/or in parallel with one another. An example of an acceptable type of supercapacitor is an electric double layer type capacitor ("EDLC"). In particular, a plurality of EDLCs combined in series and/or in parallel can collectively provide a capacitive energy storage device with a voltage rating that is acceptable for use in a battery driven elevator. In addition to, or alternatively, the additional power storage device 42, 44 may include other types of power storage device being capable of storing/discharging large amounts of electric energy at small timescales, e.g. certain types of batteries. Usually, such types of power storage devices have a much higher power density than most conventional batteries (e.g., 10 to 100 times greater power density), but also have a relatively low energy density relative to conventional batteries (e.g., only ⅒ of the energy density). This applies to supercapacitors, and in particular to EDLCs, as one example. Conventional batteries (e.g., lead-acid batteries) have relatively slow charge and discharge times. Supercapacitors, on the other hand, can be charged or discharged at a very fast rate relative to a conventional battery. Thus, the additional power storage device 42, 44 is configured to take advantage of the aforesaid characteristics of supercapacitors. As a result, the additional power storage device 42, 44 can provide adequate power storing and power supply capabilities to take up regenerative power produced by the elevator when operating in regenerative mode for a short time, and to supply power to the elevator when operating in motoring mode for a short time.

Provision of the additional power storage device 42, 44 allows a control strategy where electric power is charged to the additional power storage device 42, 44 or discharged from the additional power storage device 42, 44 primarily, i.e. with higher priority than from/to the DC battery 16. Only once the additional power storage device 42, 44 is depleted below a voltage threshold, an electric supply path via DC battery 16 is enabled to supply the power inverter 28 concurrently. In the same way, only once the additional power storage device 42, 44 is charged above a voltage threshold, the additional electric supply path via DC battery path is enabled to charge DC battery 16 concurrently.

When the voltage level in the at least one additional power storage device 42, 44 drops below a lower threshold, and no regenerative power, or only insufficient regenerative power is available from the elevator, the additional power storage device 42, 44 may be charged indirectly from the DC battery 16 via the DC intermediate circuit 30 and power converter 26 as a current source.

This allows to reduce the charging/discharging cycles applied to DC battery 16 very efficiently, thereby improving battery life and reducing power consumption of the elevator. An additional advantage of providing additional power storage device 42, 44 is that a DC battery 16 smaller in size can be used than would typically be required in a conventional DC battery unit for a battery driven elevator. DC batteries in a conventional DC battery unit for an elevator, for example, are typically oversized to reduce charge and/or discharge rates in order to compensate for their relatively poor efficiency and/or relatively high rate of battery life degradation.

In the embodiments described herein the additional power storage device 42, 44 is connected to an input of the power converter 26. It is thus possible to add the additional power storage device 42, 44 to the power control system 10 without any modification of the internal configuration of the power controller 22. In particular, as the power converter 26 comprises a number of phase legs made up with active power switches, like MOSFETs, these power switches can be controlled in such a way that power converter 26 will act as a DC/DC switch opening or closing a current path to the additional power storage device 42, 44. In addition, the power converter 26 may act as a DC/DC converter for converting voltage levels between the voltage level of the DC intermediate circuit 30 and the voltage level provided by the additional power storage device 42, 44. Particularly, a normal power converter 26 will have the configuration of at least one phase leg, e.g. three phase legs, each phase leg including power switches connected between the positive and negative poles of the DC intermediate circuit 30 on the one side (output side), and an input on the other side (input side). When the power controller 22 is connected as normally, a respective phase of an AC power signal is connected to the input of a respective phase leg of the power converter 26, and the power converter 26 provides a rectified power signal at the output of the phase leg. According to the embodiments described, this configuration of each phase leg of the power converter 26 is employed as a respective DC/DC switch for the additional power storage device 42, 44. The DC/DC switch can be opened (OFF condition) or closed (ON condition) by applying respective control signals to the power switches of the respective phase leg.

One or more additional power storage devices 42, 44 may be connected to the input of power converter 26. The additional power storage devices 42, 44 may be connected in parallel to each other. In the embodiment shown in FIG. 1 two additional power storage devices 42, 44 are connected in parallel to the input of power converter 26. Each of these additional power storage devices 42, 44 is connected to a respective input of one of the phase legs of the power converter 26. This allows to add additional storage devices 42, 44 as required by controlling the power switches in power converter 26.

The power control system 10 also includes a dynamic braking resistor 52 and a dynamic braking switch. The dynamic braking switch may be a MOSFET transistor, but it is to be understood that other types of switches may be used. In regenerative mode, if the current produced at electric motor 24 is excessive, the dynamic braking switch is turned on (e.g., pulsed ON and OFF with a duty cycle) and current flows through dynamic braking resistor 52. Excess energy is dissipated through the dynamic braking resistor 52. It is to be understood that multiple dynamic braking resistors 52 and corresponding dynamic braking switches may be employed in the power control system 10. The dynamic braking resistor 52 is connected to an input of power converter 26 in parallel to power storage devices 42, 44. Therefore, the dynamic braking resistor 52 can be added to the power control system 10 without any need to modify the internal configuration of power controller 22. Particularly, there is no need to connect the dynamic braking resistor 52 to the DC intermediate circuit 30 directly. Moreover, switching capabilities provided by the power converter 26 can be used for activating/deactivating the dynamic braking resistor 52. For example, where power converter 26 is provided with phase legs made up with active switching elements, e.g. MOSFETs or other transistors, the switching elements of one of these phase legs can be used as dynamic braking switches for establishing or interrupting an electrical connection between the positive pole of the DC intermediate circuit 30 and a current path through dynamic braking resistor 52 to the negative pole or ground of the intermediate circuit 30. It is thus not necessary to provide a separate dynamic braking switch. Usually, the dynamic braking switch will be activated as a parachute measure, to dissipate excess regenerative power in cases where so much power is regenerated that neither the power storage devices 42, 44 can take up all of the regenerated power, nor the regenerated power not taken up by the power storage devices 42, 44 can be stored in DC battery 16 without risk of overcharging.

Particular embodiments may include any of the following optional features. These features apply to any of the power control system for a battery driven elevator, the method of assembling a power control system of a battery driven elevator, and the use of a power controller in a battery driven elevator described herein. In addition, these features may be employed separately, or in combination with each other, unless described otherwise.

By connecting an output of the DC battery to the DC intermediate circuit of the power controller, a commercial "off the shelf" power controller may be used for a power control system of a battery driven elevator. Such commercial "off the shelf" power controllers are normally used for providing drive power for an electric motor from an AC power source (e.g. a single phase or three-phase AC power grid) as a primary source of power. The AC power source would normally be connected to the input of the power controller. The DC battery, which is the primary source of power in the battery driven elevator, is connected to the intermediate DC circuit of the power controller instead of the input of the power controller. This allows to extend the capability of a battery driven power control system for an elevator to cover higher usage duties. Being driven by a battery, the elevator is relatively immune with respect to power glitches which may occur under inferior power supply conditions. Particularly, the elevator may be operated smoothly even under frequent power outage conditions or under conditions where electric power supply is not sufficient to drive the elevator car continuously.

Particularly, the power controller may be a regenerative power controller. In a regenerative power controller, the power converter is made up with active power switching elements, e.g. MOSFETs, IGBTs, or other semiconductor switches. These active power switches may be controlled by applying respective control signals to control terminals which enables the power converter to be operated in a different mode of operation. In particular, a power converter including active power switching elements may be controlled in such a way as to provide the function of a DC/DC switch, or DC/DC converter.

In particular embodiments, at least one additional power storage device may be connected to an input of the power converter. The additional power storage device may comprise a supercapacitor, or any other type of power storage device being capable of being charged or discharged at a very fast rate relative to a conventional battery. For example, the supercapacitor may have the configuration of an EDLC (electric double layer type capacitor). The additional power storage device may include a plurality of individual super-capacitors which may be connected in series and/or in parallel with one another. In particular, a plurality of EDLCs connected in series and/or in parallel can collectively provide a capacitive energy source with a voltage rating that is acceptable for use in a battery driven elevator system. A plurality of additional power storage devices may be connected in parallel to a respective input of the power converter.

The power control system further may comprise a braking resistor connected to an input of the power converter. In particular, the braking resistor may be connected in parallel to the additional power storage device. By connecting a braking resistor to the input of the power converter, it is not necessary to change the internal configuration of the power controller when adding a braking resistor to the power control system. There is particularly no need to connect the braking resistor directly to the intermediate DC circuit, as is usually done. As an additional advantage, no additional braking switch is required for the braking resistor. Rather, the braking resistor can be controlled by using the power switching elements of the power converter as the braking switch. For example, the braking resistor can be connected to the input of one of the phase legs of the power converter, thereby the braking switch can be activated by closing the power switches in one of the phase legs of the power converter, in order to dissipate excessive electric energy produced by the elevator (e.g. when operating in regenerative mode).

In particular embodiments, the power converter may be configured as a DC/DC converter. When used as normal (i.e. when the power controller is connected to an AC power supply), the power converter basically provides the function of a rectifier or AC/DC converter. According to embodiments described herein, the power converter may be reconfigured in such a way that it provides the function of a DC/DC converter, thereby allowing to connect at least one additional power storage device to the power controller.

As described, in a battery driven elevator the DC battery provides the primary source of electric energy for driving the elevator. Thereby, the battery is connected to an electric power supply. In particular embodiments, the DC battery may be connected to an electric power supply via a charger circuit configured to produce, and maintain, an appropriate state of charge of the DC battery. Moreover, in particular embodiments, the DC battery may be connected to the DC intermediate circuit via a DC/DC converter. Such DC/DC converter may provide for an adjustment of different voltage levels between the output of the DC battery and the DC intermediate circuit, if desired.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiments of the invention have been described, it is to be understood that aspects of the invention may include only some of the described embodiments and that various aspects of the invention, although described in conjunction with one exemplary embodiment may be used or adapted for use with other embodiments even if not expressly stated. Accordingly, the invention is not to be seen as being limited by the foregoing description, but is only limited by the scope of the appended claims.

REFERENCES

10 power control system
12 main power
14 charger circuit
16 DC battery
20 drive unit
22 power controller
24 electric motor
26 power converter
28 power inverter
30 DC intermediate circuit
32 DC intermediate circuit capacitor
34 DC/DC converter
42 power storage device
44 power storage device
52 braking resistor

What is claimed is:

1. A power control system for a battery driven elevator; the power control system comprising:
   a battery charger having an input configured to be connected to a source of main power;
   a DC battery connected to an output of the battery charger, the DC battery for providing electrical power to an electric motor of the elevator system; and
   a power controller including a power converter, a power inverter, and a DC intermediate circuit connected in between the power converter and the power inverter;
   wherein an output of the DC battery is connected to the DC intermediate circuit;
   at least one additional power storage device connected to an input of the power converter.

2. The power control system according to claim 1, wherein the power controller is a regenerative power controller the power converter of which is made up with active power switching elements.

3. The power control system according to claim 1, wherein the additional power storage device comprises a supercapacitor.

4. The power control system according to claim 1, further comprising a braking resistor connected to an input of the power converter.

5. The power control system according to claim 4, wherein the braking resistor is connected in parallel to the additional power storage device.

6. The power control system according to claim 1, wherein the power converter is configured as a DC/DC converter.

7. The power control system according to claim 1, wherein the DC battery is connected to an electric power supply via a charger circuit; and/or wherein the DC battery is connected to the DC intermediate circuit via a DC/DC converter.

8. A battery driven elevator comprising an electric motor for driving an elevator car between landings; and the power control system according to claim 1.

9. A method of assembling a power control system for a battery driven elevator comprising:
   providing a DC battery,
   providing a power controller comprising a power converter, a power inverter at least one additional power storage device connected to an input of the power converter, and a DC intermediate circuit connected in between the power converter and the power inverter;
   providing a battery charger having an input configured to be connected to a source of main power;
   connecting an output of the battery charger to the DC battery; and
   connecting the DC battery to the DC intermediate circuit of the power controller.

10. The method according to claim 9, wherein providing a power controller comprises providing a regenerative power controller the power converter of which is made up with active power switching elements; and the method further comprising configuring the power converter as a DC/DC converter.

11. The method according to claim 9, further comprising connecting a braking resistor to an input of the power converter.

* * * * *